Feb. 14, 1933.　　　M. W. BOWEN　　　1,897,230
HYDRAULIC BRAKING SYSTEM
Filed March 12, 1930　　5 Sheets-Sheet 1

Inventor:
Myron W. Bowen
By Williams, Bradbury, McCaleb & Hinkle
Attys.

Feb. 14, 1933.　　　　M. W. BOWEN　　　　1,897,230
HYDRAULIC BRAKING SYSTEM
Filed March 12, 1930　　　5 Sheets-Sheet 2
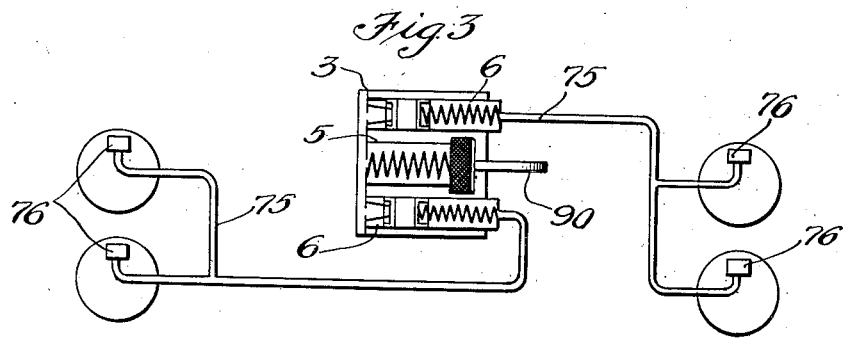
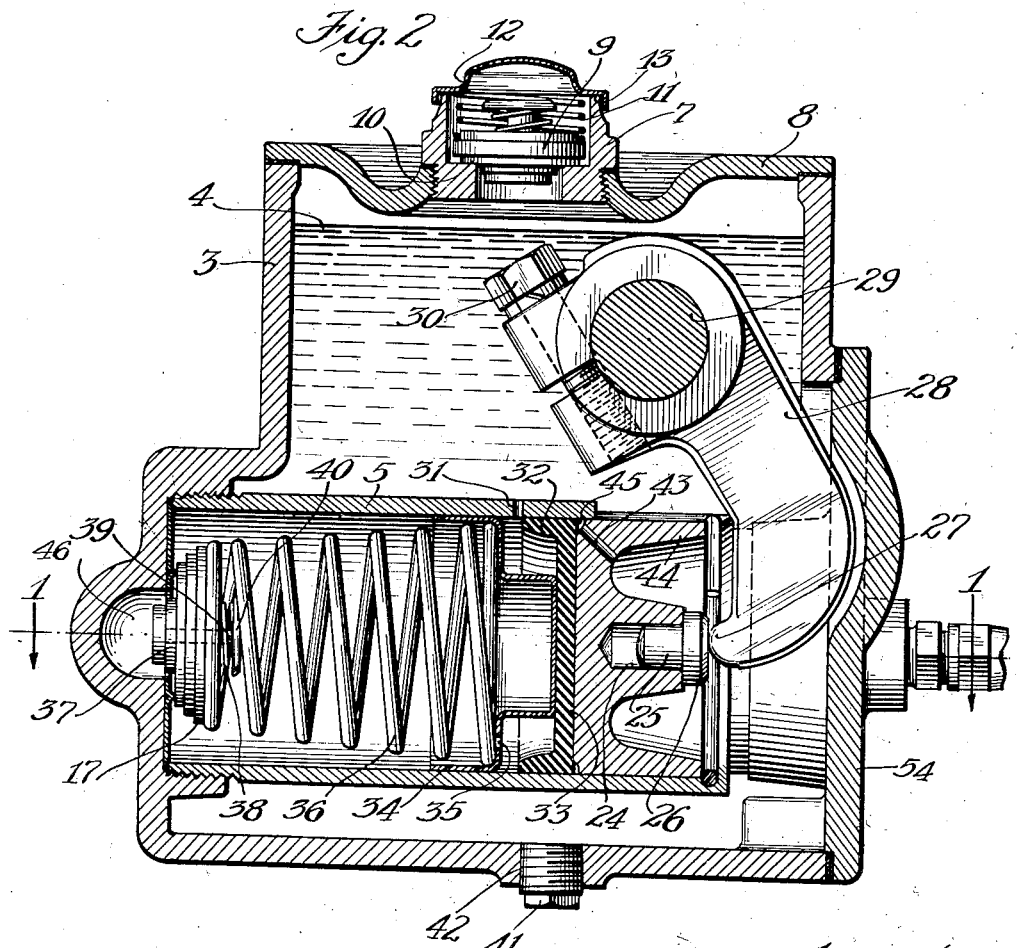
Inventor:
Myron W. Bowen
By Williams, Bradbury, McCaleb & Hinkle
Attys.

Feb. 14, 1933.                    M. W. BOWEN                    1,897,230
                          HYDRAULIC BRAKING SYSTEM
                    Filed March 12, 1930        5 Sheets-Sheet 3
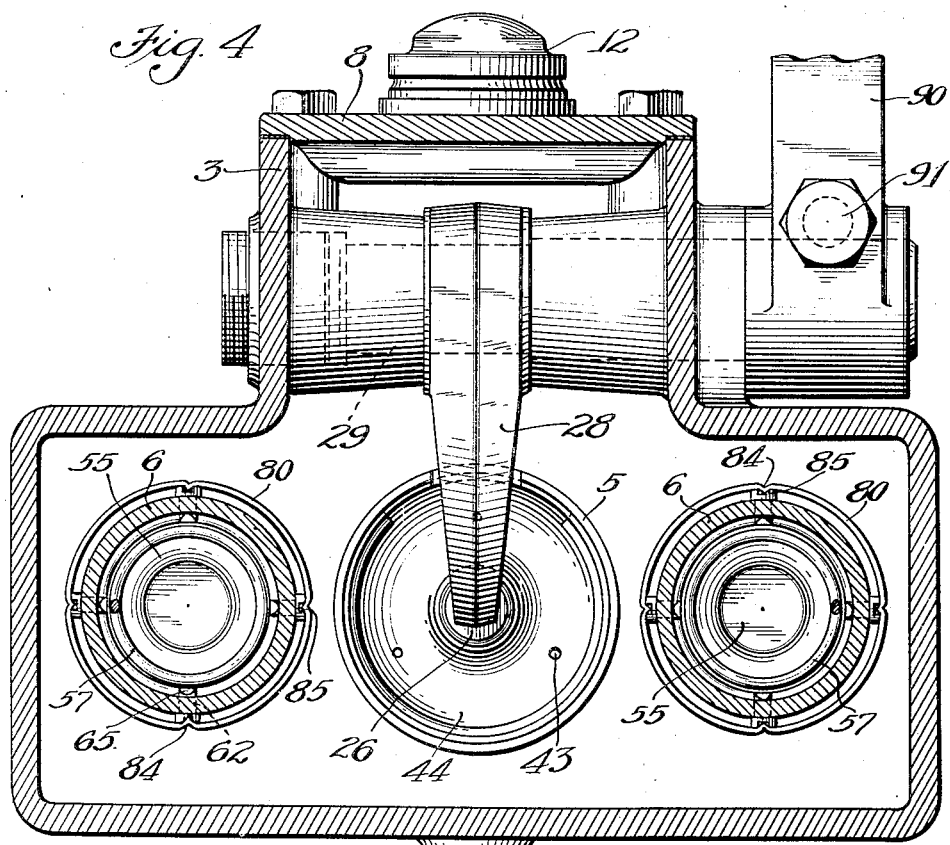
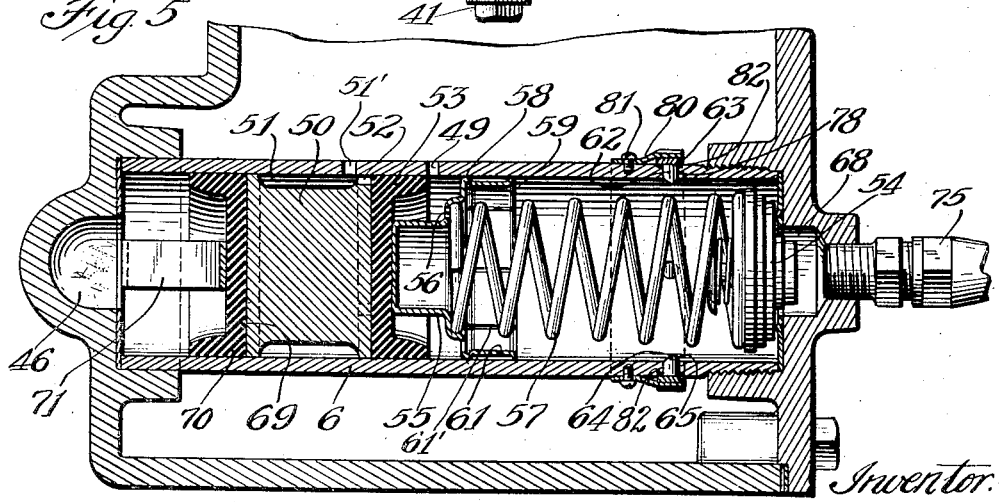
Inventor.
Myron W. Bowen
By Williams, Bradbury, McCaleb & Hinkle
Attys.

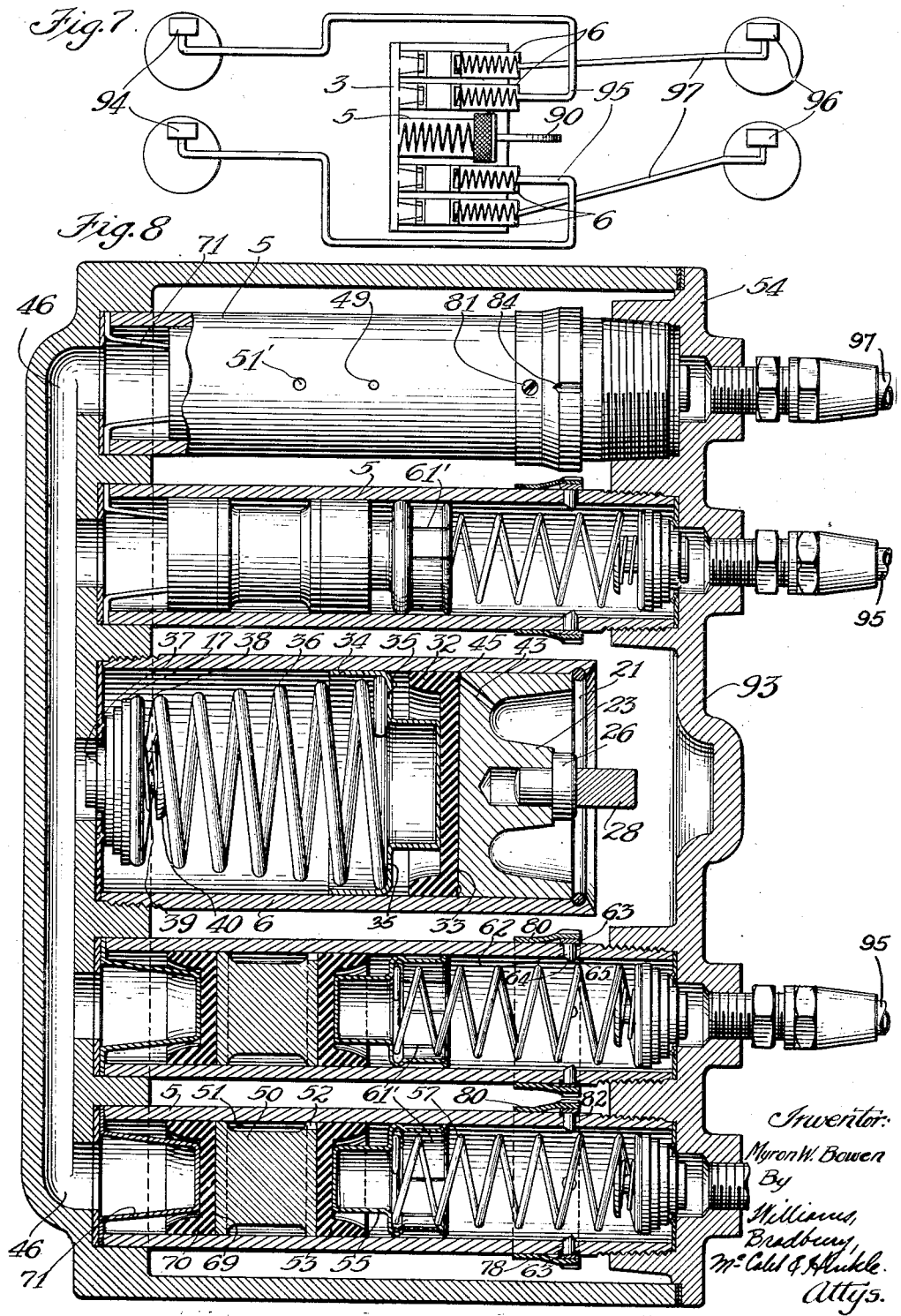

Feb. 14, 1933.　　　M. W. BOWEN　　　1,897,230
HYDRAULIC BRAKING SYSTEM
Filed March 12, 1930　　　5 Sheets-Sheet 5

Inventor:
Myron W. Bowen
By Williams, Bradbury, McCaleb & Hinkle
Attys.

Patented Feb. 14, 1933

1,897,230

UNITED STATES PATENT OFFICE

MYRON W. BOWEN, OF DETROIT, MICHIGAN, ASSIGNOR TO HYDRAULIC BRAKE COMPANY, OF LOS ANGELES, CALIFORNIA, A CORPORATION OF CALIFORNIA

HYDRAULIC BRAKING SYSTEM

Application filed March 12, 1930. Serial No. 435,081.

This invention relates to a hydraulic braking system and more particularly to a system of the type especially adapted for use on motor vehicles.

In the usual hydraulic braking system represented by patents in the prior art, a severe leak in any of the conduits leading to the brakes will put the whole system out of operation, and a small leak will gradually bleed the system of the fluid which is used for the application of the brakes.

An object of this invention is the provision of means whereby a break in one conduit leading to a brake cylinder, causes the conduit to be segregated from the system and permits the brakes operated by fluid from other conduits to remain in the system and operative in a normal manner.

Another object of this invention is the provision of means adapted to segregate a defective conduit even though it is not entirely broken off but when a leak therein becomes of such size that the pressure fluid will drain the secondary cylinder upon prolonged application of the brakes.

In the accompanying drawings Figure 1 is a horizontal section taken through a reservoir and through hydraulic cylinders and taken on the line 1—1 of Figure 2;

Figure 2 is a vertical section taken on the line 2—2 of Figure 1;

Figure 3 is a diagrammatic illustration of the system incorporating my invention;

Figure 4 is a vertical section taken on the line 4—4 of Figure 1;

Figure 5 is a vertical section taken on the line 5—5 of Figure 1;

Figure 7 is a diagrammatic illustration of a system embodying a modified form of my invention;

Figure 8 is a horizontal section similar to Figure 1 but showing the details of the modification shown in Figure 7.

Figure 1:
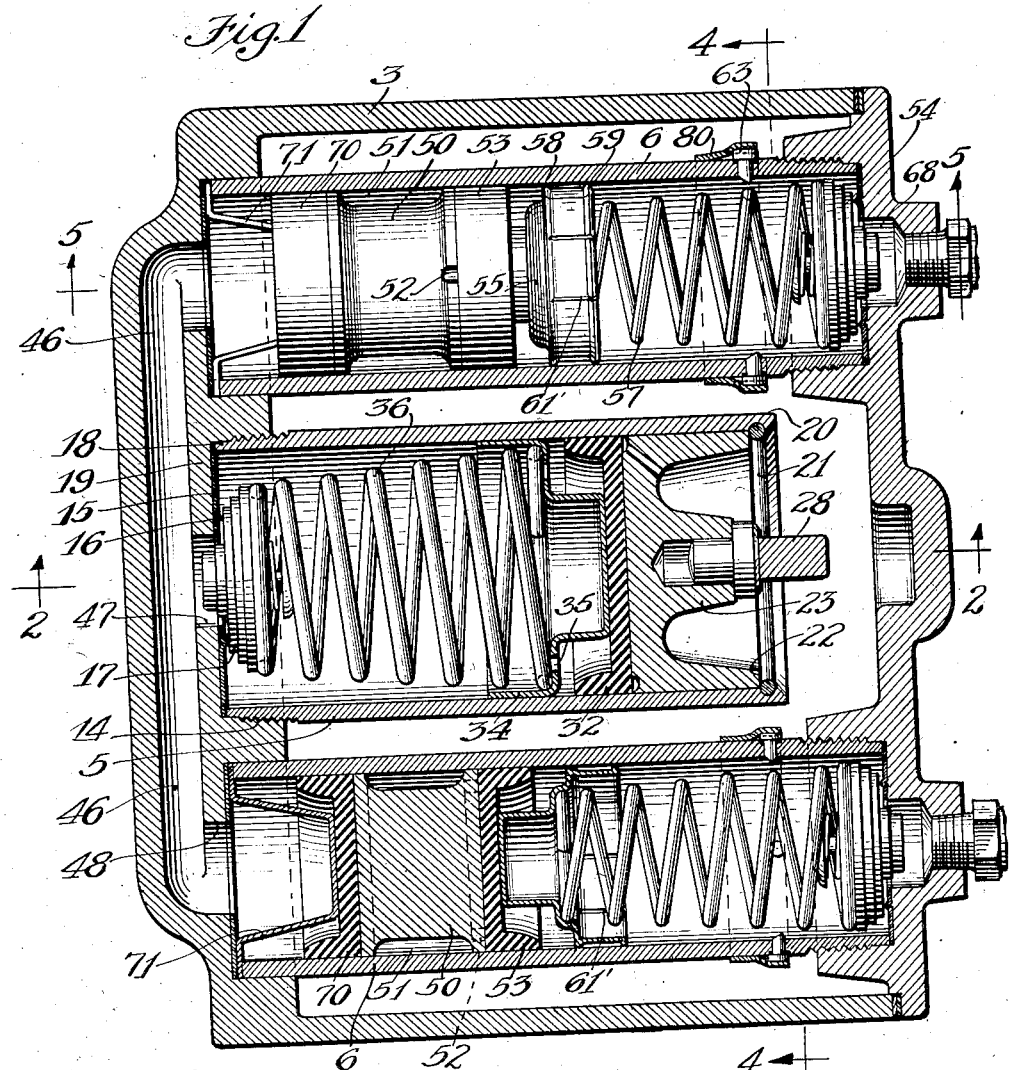

Referring to Figures 1 and 2 I provide a reservoir 3 adapted to contain liquid 4 therein of sufficient depth to at all times completely cover the master cylinder 5 and a plurality of secondary cylinders 6. A suitable filling cap 7 is provided through the cover 8. The filling cap is provided with a valve 9 which is yieldingly held on the shoulder 10 by means of a coil spring 11 which engages a plate 12 suitably fixed on the upper edge 13 of the filling cap wall.

The master cylinder 5 has threaded engagement at 14 with one end of the reservoir and is thereby rigidly held in place. A valve seat formed of a disc 15 having an annular ridge 16 thereon adapted to engage the forward side of the valve 17 is held in position between the end 18 of the cylinder wall and the side 19 of the reservoir. The free end of the master cylinder is provided with a groove 20 in which is fitted a spring stop member 21 adapted to be engaged by the rearward edge 22 of the master piston 23 when in its normal position. The rear end of the master piston 23 is provided with a cylindrical aperture 24 into which is fitted a stud 25 having a head 26 on the outer end adapted to be engaged by the end 27 of the lever 28 which forces the piston forward upon actuation of the shaft 29 on which it is rigidly secured by a bolt 30. The master cylinder is provided with an opening 31 which permits fluid from the reservoir to pass directly into or out of the cylinder when the piston is in its normal or rearward position. A cup member 32 is seated against the forward side 33 of the master piston and is held in position by a cup-like spring retainer 34 having openings 35 therein for the passage of liquid. The retainer 34 receives and holds in position one end of the spring 36, the other end of which urges against the valve 17 for normally retaining the latter in contact with its seat.

The valve 17 has a passageway therethrough which is normally closed by a second valve 37 which is held in place by a spring 38 which urges longitudinally on a pin 39 through the medium of its head 40. The valve portion 37 is secured to the forward end of the pin 39 as shown in Figure 2.

A suitable drain plug 41 is provided in an opening 42 in the bottom of the reservoir for permitting the same to be drained periodically as may be desired.

The master piston is provided with ducts 43 extending from the annular recess 44 in the rear side of the piston to a recess 45 in the face of the piston so that upon the return movement of the master piston fluid will pass therethrough and by the periphery of the cap 32 which will be flexed forwardly on account of friction with the sides of the cylinder, aided by a partial vacuum created in the cylinder as the spring 36 forces the piston rearwardly.

Fluid passageways 46 lead from the outlet 47 of the master cylinder to the inlets 48 of the auxiliary cylinders 6. The auxiliary cylinders are provided with openings 49 permitting the passage of liquid from the reservoir into the cylinder when the auxiliary pistons 50 are in their normal position, as best shown in Figure 5. The pistons 50 have concave peripheries each providing a pocket 51 between the piston body and the wall of the cylinder which has communication with the reservoir through a port 51′. A plurality of apertures 52 provide communication from the pocket 51 to the rear side of the cup 53 through which fluid may pass upon the return stroke of the piston since, as in the case of the master cylinder, the cup 53 flexes forwardly upon its return movement and allows fluid to pass. The compound valve mechanism 54 is substantially identical to that described with reference to the master cylinder and will not again be described in detail. The retaining member 55 engages the forward side of cup 53 and is provided with openings 56 through which fluid may freely pass. The spring 57 urges rearwardly against the retainer 55 and thereby urges rearwardly on the piston 50. The retainer 55 is provided with a bead 58 engaging the inner concave surface of the cylinder 6. The forward edge 59 of the retainer also engages the side of the cylinder and together with the bead 58 holds the retainer in line as it moves forwardly and rearwardly. The portion 61 of the retainer which extends between the forward edge 59 and the bead 58 is pressed inwardly and provided with slots 61′ to permit it to flex and accommodate the inner end 62 of pins 63 when the piston 50 is forced forwardly to the limit of its stroke. The pins 63 are provided with cam faces 64 and 65, the former of which is of less pitch and presses the edge 59 of the retainer 55 backwardy against its inherent spring action sufficiently that it may pass over the end of the pin 63. The pitch of the cam surface 65 is relatively steep such that the force of the spring 57 is not sufficient to force the edge 59 over the end of the pin 63 unless it is aided by a substantial fluid pressure at the outlet 68 of the secondary cylinder.

On the rear face 69 of the secondary piston is seated a cup 70 which is retained thereagainst by a stop member 71 when the piston is in its normal position and is held thereagainst by fluid pressure from the passageway 46 when being moved forwardly or rearwardly since the spring 36 in the master cylinder presses the valve 17 against its seat with sufficient pressure to constantly maintain a minimum pressure in the passageway 46 of about 8 pounds. The spring 57 in the auxiliary cylinders is of sufficient strength to hold the valve 54 on its seat with sufficient pressure that a minimum fluid pressure of substantially 10 pounds is maintained in the conduits 75 leading to the brake cylinders 76 as shown in Figure 3.

In case of breakage of one of the conduits 75 the fluid pressure therein reduces to substantially zero and the piston 50 moves forwardly to its limit, causing the edges 59 of the retainer 55 to engage over the ends of the pins 63 which form in effect a latch or lock mechanism which retains the member 55 in its forward position, preventing action of the spring 57 upon the piston 50 and cuts out or segregates those brakes from the system which are connected with the broken conduit. In case the conduit is not fully broken but has a leak of such size that the secondary cylinder will be drained during the prolonged application of the brake, retainer 55 is locked by the pins 63. In order to again place an auxiliary cylinder into operation it is only necessary to force fluid under pressure into the outlet cavity 68 for aiding the spring 57 in forcing the edge 59 of the retainer back over the cam surface 65.

For holding the pins 63 in position in the openings 78 through the sides of the cylinder 6 I provide a collar 80 which is held in place by screws 81 as shown in Figure 5. In order to prevent leakage of fluid by the pins 63 I provide suitable gaskets 82 under the heads of the pins as shown. The collar 80 is provided with inwardly extending ridges 84 which extend into slots 85 in the heads of the pins 63 for holding them in such position that the cam faces 64 and 65 will remain in the positions shown in Figure 5. If desired, pins 63 may be welded in place.

Figure 6:
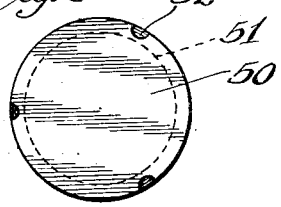
Figure 6 is a front elevational view of one of the secondary pistons removed from the cylinder.

In Figure 6 is more clearly shown the secondary piston 50, having the concaved portion providing cavity 51 which is open to communication with the rear side of the cup 53 by means of the recesses 52.

Referring to Figure 4 the rock shaft 29 is normally actuated by a lever 90 secured thereto by a set screw 91 in any suitable manner.

In the modification of my invention illustrated in Figures 7 and 8 the reservoir 93 is provided with four secondary cylinders 6 instead of two as shown in the preferred form. As will be noted by reference to Figure 7 the rear brake cylinders 94 are each connected to one of the secondary cylinders which are nearest adjacent the master cylinder by means of conduits 95 and the front brake cylinders 96 are connected by means of conduits 97 to the secondary cylinders farthest from the master cylinder 5. It is not essential that this arrangement be used but I prefer to use them this way in practice. If in the use of this modification one of the conduits 95 become defective the cylinder connected therewith is locked out of operation in the manner hereinafter described and only one brake is thrown out of use while the remaining brakes are still operated in exactly the same manner as before the conduit became defective, except that the stroke of the master cylinder will be appreciably less since there is less capacity into which fluid may be displaced from the master cylinder.

A defect in one of the conduits leading to any of the brake cylinders will be very readily detected for the reason that upon application of the brakes the first time after the defect occurs the piston in the master cylinder will have a greater forward stroke than normal since the secondary piston will move its limit which is not the case during normal operation of the brakes as it is normally necessary to move the secondary pistons only a fraction of their full stroke which is sufficient to displace enough fluid for use in the brake cylinders in applying the brakes.

Figure 9:
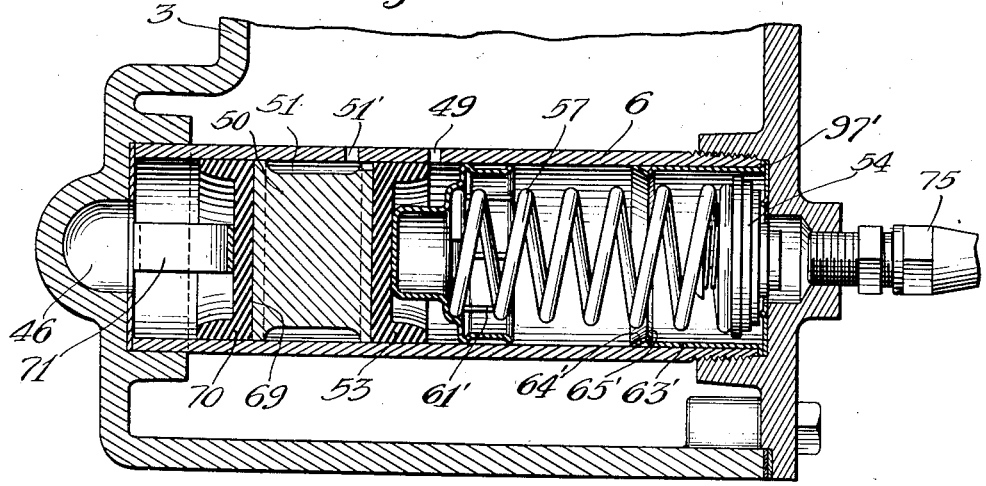
Figures 9 and 10 are sections similar to Figure 5 and showing modified forms of the locking mechanism.

In the form of my invention shown in Figure 9 the pins 63 are dispensed with and I employ instead a substantially cylindrical member 63', the outer end of which is flared into a flange 97' which is fixedly secured under the end of the cylinder 6. The inner end of the member 63' is provided with two cam surfaces 64' and 65', the former of which has a radial pitch of about 30 degrees and the latter a pitch of about 60 degrees so that it will cooperate with the forward edge of the retainer element 55 in the same manner as hereinbefore set forth with reference to the cam surfaces on the pins 63 shown in Figure 5, and for the accomplishment of the same purpose.

Figure 10:
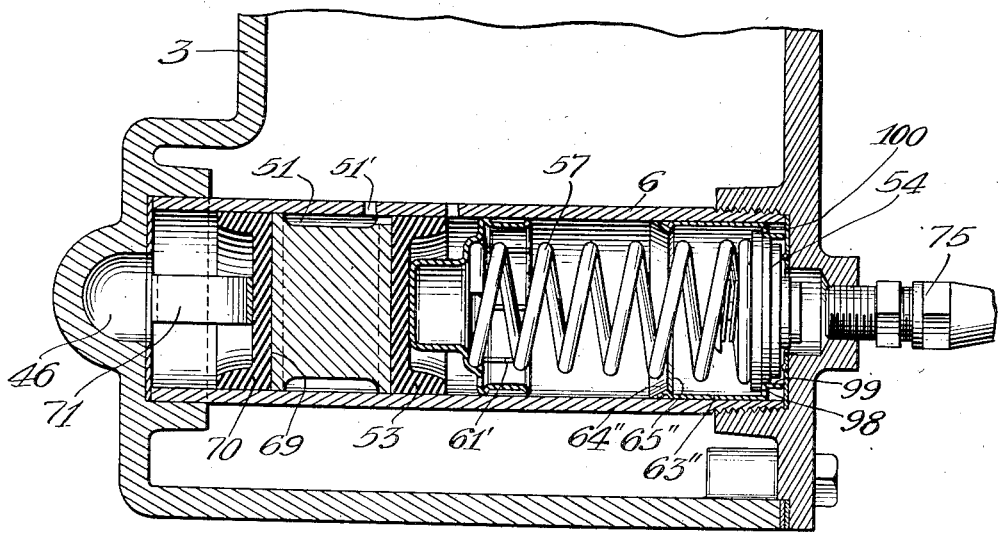

In the form of my invention shown in Figure 10 the cylindrical element 63" is provided with similar cam surfaces 64" and 65" which serve the purpose above stated. The outer end of the element 63" is provided with a flange 98 extending inwardly to engage under the forward edge of a portion of the valve mechanism 54. The flange 98 is provided with perforations 100 for permitting the passage of fluid therethrough. A flange 99 on the inner edge of flange 98 extends forwardly against the valve seat for normally holding the element 63" in position as shown in Figure 10.

It will be understood by those skilled in the art that other means of locking the secondary pistons forwardly or in some other manner segregating a defective conduit from the system may be devised and I do not, therefore, desire to restrict my invention to the forms shown in the drawings but wish to avail myself of such modifications as come within the scope of the appended claims.

I claim as my invention:

1. In a hydraulic brake system, in combination a master cylinder, a plurality of secondary cylinders, a reservoir containing said cylinders which are adapted to be completely immersed in liquid therein, a primary piston in said master cylinder, secondary pistons in said secondary cylinders, passageways leading from the outlet of the master cylinder to the entrance of each secondary cylinder for delivering liquid under pressure to the rear side of the secondary pistons to actuate the same forwardly upon actuation of the primary piston, hydraulically operable brake mechanisms communicating with the outlet of said secondary cylinders to be actuated by liquid pressure therefrom, means for actuating the primary piston, yielding means for individually returning each of said secondary pistons to their initial positions, means for admitting liquid from said reservoir to each of said cylinders upon their return movement, a valve at the outlet of said master cylinder adapted to maintain a predetermined minimum pressure in said passageways and behind said secondary pistons, and a latch mechanism in each of said secondary cylinders for individually and independently restraining the return action of said resilient means upon failure or loss of pressure forwardly of the receptive secondary pistons.

2. In a hydraulic braking system, in combination a plurality of cylinders adapted to contain fluid, a piston in each of said cylinders, a plurality of hydraulically operable brakes, a conduit connecting each of said cylinders to one or more of said brakes for transmitting fluid pressure thereto, hydraulic equalizing means communicating with said cylinders for delivering equal fluid pressure thereto and actuating the pistons to create fluid pressure in said conduits, resilient means in each of said cylinders for returning said pistons to their initial position, means individually restraining the returning action of said resilient means in said cylinders and other means for restraining the return action of said pistons upon failure of pressure in the conduits connecting the respective cylinders to the brakes.

3. In a hydraulic braking system, in combination a plurality of cylinders, pistons in said cylinders, a hydraulic equalizer including means for delivering fluid under equal pressure to one end of each of said cylinders for actuating said pistons, a plurality of hydraulically operable brakes communicating with the other end of said cylinders for receiving fluid under pressure therefrom upon actuation of said pistons, resilient means in each cylinder for returning said pistons upon reduction of fluid pressure in said equalizing means, means for maintaining a predetermined minimum pressure in said equalizing means for urging said pistons into operable engagement with said resilient means and means for individually restraining the returning action of said resilient means upon loss of pressure between any pistons and the brake communicating therewith.

4. In a hydraulic braking system, in combination a plurality of cylinders adapted to contain fluid, a piston in each of said cylinders, a plurality of hydraulically operable brakes, a conduit connecting each of said cylinders to one or more of said brakes for transmitting fluid pressure thereto, hydraulic equalizing means communicating with said cylinders for delivering equal fluid pressure thereto and actuating the pistons to create fluid pressure in said conduits, resilient means in each of said cylinders for returning said pistons to their initial position, means individually restraining the returning action of said resilient means in said cylinders upon failure of pressure in the conduits connecting the respective cylinders to the brakes, and means for maintaining a predetermined minimum pressure on one side of said pistons for preventing their return to the initial position when the returning action of said resilient means is restrained.

5. In a hydraulic braking system, in combination a plurality of cylinders, pistons in said cylinders, a hydraulic equalizer including means for delivering fluid under equal pressure to one end of each of said cylinders for actuating said pistons, a plurality of hydraulically operable brakes communicating with the other end of said cylinders for receiving fluid under pressure therefrom upon actuation of said pistons, resilient means in each cylinder for returning said pistons upon reduction of fluid pressure in said equalizing means, a latch mechanism for individually restraining the returning action of said resilient means upon loss of pressure between any pistons and the brake communicating therewith and means independent of said latch mechanism for maintaining said pistons in operable engagement with said resilient means.

6. In a hydraulic braking system, in combination a plurality of cylinders adapted to contain fluid, a piston in each of said cylinders, a plurality of hydraulically operable brakes, a conduit connecting each of said cylinders to one or more of said brakes for transmitting fluid pressure thereto, hydraulic equalizing means communicating with said cylinders for delivering equal fluid pressure thereto and actuating the pistons to create fluid pressure in said conduits, resilient means in each of said cylinders for returning said pistons to their initial position, and a plurality of means in said equalizer and in said cylinders respectively, cooperating upon loss of pressure in the conduit between one of said cylinders and its respective brake to prevent the return movement of the piston in said cylinder.

7. In a hydraulic braking system, the combination of a master cylinder with a plurality of secondary cylinders, and a plurality of brake cylinders, pistons in said cylinders, passageways connecting said master cylinder with said secondary cylinders, fluid lines connecting said secondary cylinders to said brake cylinders, said system being filled with fluid whereby actuation of said master cylinder delivers fluid under equal pressure to said secondary cylinders and causes the pistons therein to be actuated with equal force, and means operable upon loss of pressure in a fluid line between one of said secondary cylinders and its brake cylinder to prevent the return of the piston in said secondary cylinder, the last said means comprising a retainer disposed on the forward end of said secondary pistons and including a yieldable latch portion, and a cam member in the secondary cylinder adjacent the forward end thereof including a double faced cam portion engageable with said latch and automatically releasable therefrom upon the restoration of pressure in the fluid line connecting the secondary cylinders to the brake cylinders.

8. In a hydraulic braking system, in combination a plurality of cylinders adapted to contain fluid, a piston in each of said cylinders, a plurality of hydraulically operable brakes, a conduit connecting each of said cylinders to one or more of said brakes for transmitting fluid pressure thereto, hydraulic equalizing means communicating with said cylinders for delivering equal fluid pressure thereto and actuating the pistons to create fluid pressure in said conduits, resilient means in each of said cylinders for returning said pistons to their initial position, and a plurality of means to hold said pistons in inoperative position when hydraulic pressure in said conduit breaks down including a valve in said equalizing means for maintaining a predetermined minimum pressure behind said piston, and means for restraining the return action of said resilient means.

9. In a hydraulic braking system, in combination a plurality of cylinders adapted to contain fluid, a piston in each of said cylinders, a plurality of hydraulically operable brakes, a conduit connecting each of said cylinders to one or more of said brakes for transmitting fluid pressure thereto, hydraulic equalizing means communicating with said cylinders for delivering equal fluid pressure in said conduits, resilient means in each of said cylinders for returning said pistons to their initial position, means individually restraining the returning action of said resilient means in said cylinders upon failure of pressure in the conduits connecting the respective cylinders to the brakes, and a valve mechanism in said equalizing means for maintaining a predetermined minimum pressure on one side of said pistons for preventing their return to initial position when the returning action of said resilient means is restrained.

10. In a hydraulic braking system, in combination a plurality of cylinders adapted to contain fluid, a piston in each of said cylinders, a plurality of hydraulically operable brakes, a conduit connecting each of said cylinders to one or more of said brakes for transmitting fluid pressure thereto, hydraulic equalizing means communicating with said cylinders for delivering equal fluid pressure thereto and actuating the pistons to create fluid pressure in said conduits, resilient means in each of said cylinders for returning said pistons to their initial position, and a plurality of means to hold said piston in forward position upon breaking down of pressure in said conduit including a valve in said equalizing means for maintaining a predetermined minimum pressure behind said piston and a latch mechanism for restraining the return action of said resilient means.

11. In a hydraulic braking system, a cylinder adapted to contain fluid, a piston in said cylinder, a hydraulically operable brake, a conduit through which fluid may pass from said cylinder to said brake, means for actuating said piston to create a fluid pressure in said conduit, means for returning said piston to its initial position, and latch means adapted to prevent action of said returning means upon loss of pressure in said conduit, said latch means comprising a double faced cam portion adapted to be automatically unlatched upon the return of pressure in said conduit.

12. In a hydraulic braking system, a cylinder adapted to contain fluid, a piston in said cylinder, a hydraulically operable brake, a conduit connecting said brake to said cylinder for transmitting fluid pressure from said cylinder to said brake upon actuation of said piston, hydraulic means for actuating said piston, a coil spring in said cylinder to return said piston to normal position, and a latch mechanism for preventing the return action of said coil spring upon failure or loss of pressure in said conduit, said latch means comprising a double faced cam portion adapted to be automatically unlatched upon the return of pressure in said conduit.

13. In a hydraulic braking system, a cylinder adapted to contain fluid, a piston in said cylinder, a hydraulically operable brake, a conduit through which fluid may pass from said cylinder to said brake, means for actuating said piston to create a fluid pressure in said conduit, and a plurality of means cooperating to prevent the return of said piston to its initial position upon failure of pressure in the conduit connected to the cylinder containing said piston, comprising latch means in said cylinder automatically releasable by back pressure in the conduit, and means for maintaining a predetermined minimum pressure behind the piston.

In witness whereof, I hereunto subscribe my name this 8th day of March, 1930.

MYRON W. BOWEN.